P. W. GATES.
LUBRICATOR.
APPLICATION FILED APR. 19, 1915.
1,195,349.
Patented Aug. 22, 1916.
2 SHEETS—SHEET 1.
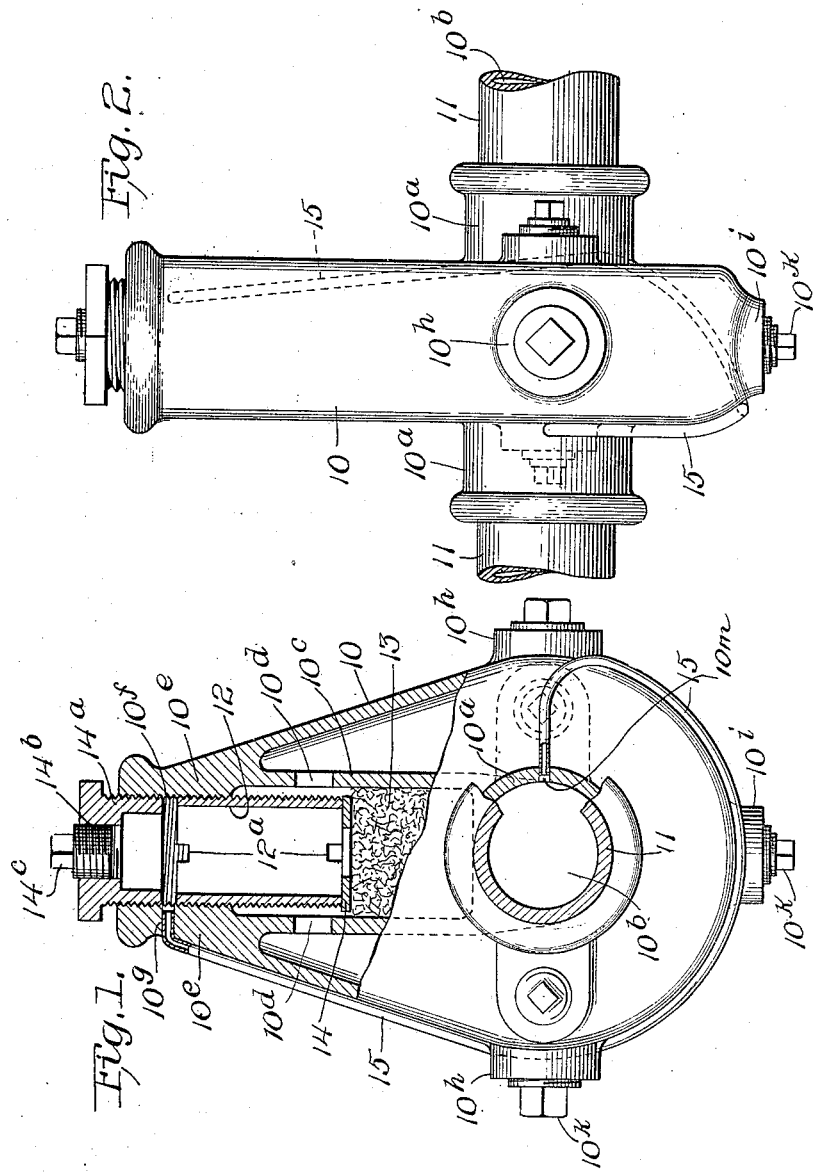
Witness:
H. S. Gaither
Inventor:
Philetus W. Gates
by Sheridan, Wilkinson & Scott
Attys.

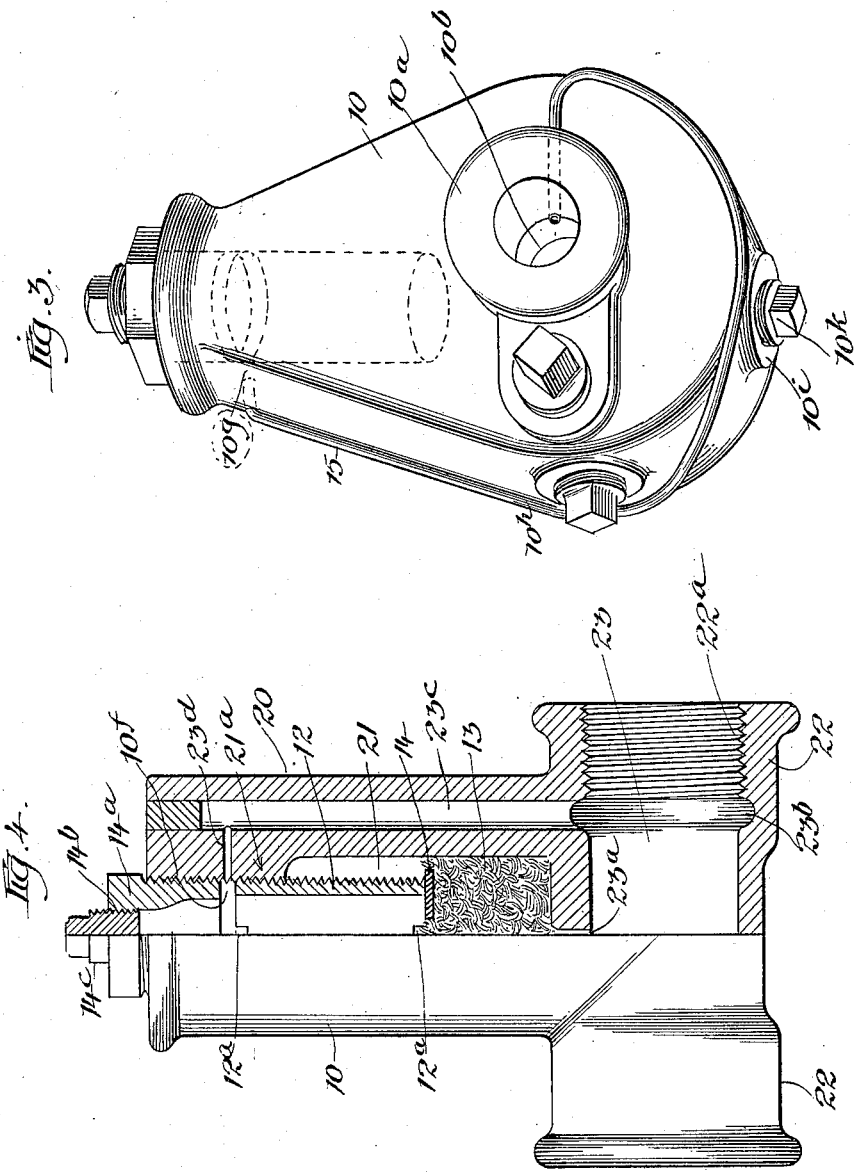

UNITED STATES PATENT OFFICE.

PHILETUS W. GATES, OF CHICAGO, ILLINOIS, ASSIGNOR TO HANNA ENGINEERING WORKS, A CORPORATION OF ILLINOIS.

LUBRICATOR.

1,195,349.  Specification of Letters Patent.  Patented Aug. 22, 1916.

Application filed April 19, 1915. Serial No. 22,478.

*To all whom it may concern:*

Be it known that I, PHILETUS W. GATES, a citizen of the United States, residing at Chicago, in the county of Cook and State of Illinois, have invented certain new and useful Improvements in Lubricators, of which the following is a specification.

This invention relates to improvements in lubricators, and has for its object to provide an improved lubricator of the type shown and described in the copending application of Albert J. Gates, Serial No. 759,594 and myself, Serial No. 870,829.

The type of lubricator to which this invention obtains is that in which a reservoir or supply of oil is maintained adjacent the air or fluid line, such lubricator being provided with means to normally prevent flow of lubricant into the line, this preventive means being arranged and constructed so that flow of fluid through the line will result in the lubricant being drawn from the reservoir into the fluid line and comminuted with the fluid flowing therethrough, as has been set forth in the above mentioned co-pending application.

It has been found that shortly after air under pressure is admitted to the line in the use of the above mentioned lubricator, the pressure forces the air or other fluid through the flow preventing means to above the level of the lubricant, until such pressure substantially balances that in the line. In many instances after operation of the machine, as the pressure dies out in the line, the air under pressure trapped above the surface of the lubricant gradually forces the latter out through the flow preventing means into the line, resulting in great waste of lubricant. This naturally results in the deposit of all or a considerable portion of the lubricant in the line so that when the machine is again started up and flow commences, this quantity of oil is driven into the machine, and being greatly in excess of the amount necessary for lubrication it is consequently wasted and repeated fillings of the reservoir are often necessary in such cases.

To overcome these objections, I have invented the lubricator described in the following specification and shown in the accompanying drawings, in which:

Figure 1 is a side elevation, partially in section, of one form of my improved lubricator shown in one position; Fig. 2 is a plan view of the same; Fig. 3 is a perspective of the same, and Fig. 4 is a side elevation, partially in section, of a modification of my improved invention.

Like numerals refer to like elements throughout the drawings, in which 10 indicates generally the shell of my lubricator, provided with outwardly extending apertured elbows $10^a$, internally threaded for engagement by the fluid line pipe 11, the shell 10 being provided with an aperture therethrough, indicated by numeral $10^b$, and arranged to communicate and form a portion of the fluid line when attached thereto. Depending into the interior of the shell 10 is the sleeve $10^c$, centrally apertured at its lowest extremity to form the aperture $10^b$, described above. This sleeve $10^c$ is provided with the apertures $10^d$ adjacent its junction with the shell 10, as shown in Fig. 1, the shell 10 being provided with the thickened or reinforced head portion $10^e$ at such junction. This head $10^e$ is centrally apertured at $10^f$ and internally threaded, as shown.

The threaded sleeve or cup 12 is threaded downwardly in the aperture $10^f$ and projects a considerable distance into the interior of sleeve $10^c$. In the bottom of the latter is provided a mass of tightly compressed fibrous material 13, such as waste, felt or the like, upon which bears an apertured washer 14 or the like. This washer is maintained in position pressing down on the compressed material 13 by the sleeve 12, the latter being slotted top and bottom, as indicated by numeral $12^a$, for engagement by a screwdriver, or other tool. Upwardly of the cup or sleeve 12, the cap $14^a$ is threaded into the aperture $10^f$ and normally closes the same. This cap is centrally apertured at $14^b$ and a removable threaded plug $14^c$ is utilized to close this opening and to permit pouring lubricant therethrough, when necessary. The bottom of plug $14^a$ is preferably arranged to lie a slight distance above the cup 12, as shown in Fig. 1, and an aperture $10^g$ is formed in the head $10^e$ of the shell 10 leading into the aperture $10^f$, preferably at the gap between the plug 14 and cup 12, as is clearly shown. Bosses $10^h$ are provided at suitable locations at each side of the shell 10, and a similar boss $10^i$ is provided on the bottom thereof, as viewed in Figs. 1 and 2, for example. Each of these bosses is apertured, threaded and normally closed by a threaded plug 10<sup>k</sup>. The purpose of these apertures is to enable filling of the shell 10, no matter in what position the lubricator may be utilized, as will be apparent.

It will be apparent that in applying this lubricator to the fluid line 11, in the event that the head end 10<sup>e</sup> of the shell 10 is upright, oil may be supplied to the interior of cup or sleeve 12, through the aperture 14<sup>a</sup>, but in an inverted or angular position oil may be supplied through the uppermost of apertured bosses 10<sup>h</sup> or 10<sup>i</sup> to the interior of shell 10, and hence may flow through apertures 10<sup>d</sup> into contact with a portion of the material 13, and also fill cup or sleeve 12. Assuming that oil is in the shell 10 or cup 12, flow of air through the line 11 will result in drawing a sufficient amount of the lubricant through the material 13, the latter normally preventing such flow of the lubricant, save upon flow of the fluid.

It will be apparent, that as described above, assuming that oil is in the shell 10 and sleeve 12, no matter in what position the lubricator may be placed, oil will always contact with material 13 to enhance its extraction therethrough, and therefrom by the flow of the fluid. As explained in the preamble to this specification, it has been found, in some instances, that air pressure will obtain in the interior of shell 10, or sleeve 12, above the surface of the oil or other lubricant, and result in the forcing of the oil through the material 13 into the pipe line 11, during the non-operation of the machine element. To overcome this objection, I provide a duct or tube 15 leading from and communicating with the aperture 10<sup>g</sup>, through an aperture 10<sup>m</sup> in one of the elbows 10<sup>a</sup>. I also arrange the duct 15, as shown in the drawings, so that no matter in what position the lubricator 10 may be placed, one portion of the duct 15 will always lie above the level of the inclosed lubricant. It will be apparent that if pressure obtains in the line an equivalent pressure will also obtain in the interior of the shell 10 or sleeve 12, through the medium of the duct 15, so that when a condition is present, such as I have described above, as the pressure in line 11 dies out, it will also die out in the interior of shell 10 or sleeve 12. Furthermore, by arranging the duct 15, as I have explained, with one point above the level of the lubricant in all positions of the lubricator, the lubricant will not be conveyed through the duct 15 into the line 11, as will be obvious. It will also be obvious that I may incorporate the duct 15 in the body of the shell 10, or in the interior thereof, if I so desire without altering the operation or function of such duct.

In Fig. 4 I have shown a modified or simplified form of lubricator to which I have applied my invention. This lubricator consists of the shell 20, centrally apertured at 21, and provided with the angularly disposed elbows 22, centrally apertured as indicated by numeral 23, this aperture 23 being intended to form a portion of the fluid line, the pipe sections thereof being capable of being threaded into engagement with the threaded interior 22<sup>a</sup> of the elbows 22. A wall of the aperture 23 is apertured at 23<sup>a</sup> to communicate with the chamber 21, in the bottom of which is located the material 13 which is maintained in tightly compressed condition by the apertured washer 14, which in turn is maintained in its position by the exteriorly threaded sleeve or cup 12, all of which are described above in connection with the preferred form of my invention. This sleeve 12 threadedly engages an inwardly projecting flange 21<sup>a</sup> forming a portion of the wall of the chamber 21 and above the cup or sleeve 12, and spaced slightly therefrom is the threaded plug 14<sup>a</sup> having the centrally located aperture 14<sup>b</sup> in which is threaded the plug 14<sup>c</sup>, as described above. A groove 23<sup>b</sup> extends around the wall of aperture 23 and from this groove 23<sup>b</sup> leads an upwardly extending duct or passage 23<sup>c</sup> from which leads an angularly disposed duct 23<sup>d</sup> to the gap between the plug 14<sup>a</sup> and sleeve 12. In this modification I have provided a lubricator which is intended principally for use where the plug 14<sup>c</sup> will be retained in uppermost position, this form not being intended for use in a variety of positions. The operation of the lubricator is substantially similar to that of the form described above, and it will be apparent that through the medium of groove 23<sup>b</sup> and ducts 23<sup>c</sup> and 23<sup>d</sup> substantially the same pressure will constantly obtain in the sleeve 12 as in the line 23, this being especially true when the flow of fluid through line 23 has been discontinued and fluid under pressure remains therein.

While my invention is susceptible of modifications and improvements, I do not wish to be restricted to the showing or description beyond the scope of the appended claims.

What I claim is:

1. A lubricator comprising a lubricant containing chamber and constructed and arranged to be attached to a fluid line in any position, said lubricator being provided with a duct leading directly from said chamber to said line, and means to normally prevent flow of lubricant from said chamber to said line, said means being operable to permit such flow upon flow of fluid through said line, said lubricator being provided with a duct leading from said fluid line to said lubricant chamber and arranged to transmit the pressure of said fluid line to said lubricator chamber in any position of said lubricator.

2. A lubricator comprising a lubricant containing chamber and arranged to be attached to a fluid line, said lubricator being provided with a duct leading from said chamber to said line, and means to normally prevent flow of lubricant from said chamber to said line, said means being operable to permit such flow upon flow of fluid through said line, said lubricator being provided with a duct leading from said fluid line to said lubricant chamber, said duct being constructed and arranged to present a portion thereof higher than the level of the lubricant in said chamber in all operative positions of said lubricator.

3. In combination with a lubricator having a duct arranged to permit flow of fluid therethrough, a lubricant containing chamber, a duct leading from said chamber to said first named duct, means to normally prevent flow of lubricant from said chamber to said first named duct save upon flow of fluid through the latter, and means to maintain the pressure in said chamber above the level of said lubricant substantially equal to that obtaining in said first named duct in any position of said lubricator.

In testimony whereof, I have subscribed my name.

PHILETUS W. GATES.

Copies of this patent may be obtained for five cents each, by addressing the "Commissioner of Patents, Washington, D. C."